United States Patent
Jin et al.

(10) Patent No.: US 7,624,779 B2
(45) Date of Patent: Dec. 1, 2009

(54) TIRE HAVING A SIDEWALL REINFORCEMENT

(75) Inventors: Jie Jin, Stow, OH (US); Michael Crano, Fairlawn, OH (US)

(73) Assignee: Bridgestone Americas Tire Operations, LLC

( * ) Notice: Subject to any disclaimer, the term of this patent is extended or adjusted under 35 U.S.C. 154(b) by 422 days.

(21) Appl. No.: 11/219,160

(22) Filed: Sep. 1, 2005

(65) Prior Publication Data

US 2007/0044887 A1 Mar. 1, 2007

(51) Int. Cl.
 *B60C 9/00* (2006.01)
 *B60C 9/18* (2006.01)
 *B60C 15/00* (2006.01)
 *B60C 15/06* (2006.01)

(52) U.S. Cl. ............... 152/526; 152/539; 152/548; 152/549; 152/555

(58) Field of Classification Search .......... 152/540, 152/548, 549
See application file for complete search history.

(56) References Cited

U.S. PATENT DOCUMENTS

| | | | |
|---|---|---|---|
| 3,464,477 A | * | 9/1969 | Verdier ............. 152/535 |
| 3,480,065 A | | 11/1969 | Verdier |
| 3,509,930 A | * | 5/1970 | Mirtain ............. 152/555 |
| 3,554,261 A | | 1/1971 | Mirtain et al. |
| 3,703,203 A | | 11/1972 | Simpson |
| 3,736,973 A | | 6/1973 | Mezzanotte |
| 3,800,844 A | | 4/1974 | Boileau |
| 3,904,463 A | | 9/1975 | Boileau |
| 3,916,968 A | | 11/1975 | Masson |
| 3,934,634 A | | 1/1976 | Verdier |
| 4,047,551 A | | 9/1977 | Mezzanotte |
| 4,166,491 A | | 9/1979 | Mezzanotte |
| 4,177,852 A | | 12/1979 | Merli |
| 4,185,675 A | | 1/1980 | Greiner et al. |
| 4,186,789 A | | 2/1980 | Verdier |
| 4,231,409 A | | 11/1980 | Mezzanotte |
| 4,357,976 A | | 11/1982 | Mezzanotte |
| 4,365,659 A | | 12/1982 | Yoshida et al. |

(Continued)

FOREIGN PATENT DOCUMENTS

EP 0301093 A1 2/1989

(Continued)

OTHER PUBLICATIONS

Abstract of JP 01463209, Jun. 1992.*

(Continued)

*Primary Examiner*—Justin Fischer
(74) *Attorney, Agent, or Firm*—Thomas R. Kingsbury; Steven M. Auvil

(57) ABSTRACT

A tire, which has a maximum section width, an upper section above the maximum section width, and a lower section below the maximum section width, includes a tread extending circumferentially about the tire, a pair of sidewalls, a pair of bead portions, and at least one carcass ply extending circumferentially about the tire from one bead portion to the other. The tire further includes first and second reinforcement plies extending circumferentially about the tire and being disposed between the at least one carcass ply and the tread and at least one of the sidewalls of the tire. The first and second reinforcement plies have lower ends that terminate in the lower section of the tire.

21 Claims, 4 Drawing Sheets

U.S. PATENT DOCUMENTS

| | | | |
|---|---|---|---|
| 4,366,851 A | | 1/1983 | Makino et al. |
| 4,585,045 A | | 4/1986 | Morikawa |
| 4,640,329 A | * | 2/1987 | Nakasaki et al. ........ 152/209.11 |
| 4,744,400 A | | 5/1988 | Sekoguchi |
| 4,790,366 A | * | 12/1988 | Kadota ........................ 152/543 |
| 4,854,362 A | | 8/1989 | Carolla |
| 5,164,029 A | | 11/1992 | Oohashi |
| 5,261,474 A | | 11/1993 | Lobb et al. |
| 5,280,817 A | | 1/1994 | Liu |
| 5,323,829 A | | 6/1994 | Hubbell |
| 5,379,819 A | | 1/1995 | Adachi |
| 5,392,830 A | | 2/1995 | Janello |
| 5,429,168 A | | 7/1995 | Lobb et al. |
| 5,505,242 A | | 4/1996 | Narahara |
| 5,509,455 A | | 4/1996 | Warchol et al. |
| 5,524,688 A | | 6/1996 | Trares et al. |
| 5,622,576 A | | 4/1997 | Lobb et al. |
| 5,637,164 A | | 6/1997 | Dwenger |
| 5,660,654 A | | 8/1997 | Miyazaki |
| 5,858,138 A | | 1/1999 | Jara |
| 5,938,870 A | | 8/1999 | Sakamoto |
| 6,135,184 A | | 10/2000 | Fyfe |
| 6,260,598 B1 | | 7/2001 | Tanaka |
| 6,510,883 B2 | | 1/2003 | Baumann et al. |
| 6,527,025 B1 | | 3/2003 | Minami |
| 6,536,494 B1 | | 3/2003 | Baumann et al. |
| 6,588,470 B2 | | 7/2003 | Kanenari et al. |
| 6,688,357 B1 | | 2/2004 | Gerresheim et al. |
| 6,763,866 B1 | | 7/2004 | Nguyen |
| 6,802,350 B2 | | 10/2004 | Ohura |
| 2001/0010245 A1 | | 8/2001 | Kanenari et al. |
| 2002/0046795 A1 | | 4/2002 | Billieres |
| 2002/0112798 A1 | | 8/2002 | Larsen |
| 2003/0136488 A1 | | 7/2003 | Muhlhoff |
| 2004/0007303 A1 | | 1/2004 | Fishman |
| 2004/0055687 A1 | | 3/2004 | Whitney |
| 2004/0055689 A1 | | 3/2004 | Suzuki |
| 2004/0103968 A1 | | 6/2004 | Burlacot |
| 2004/0140035 A1 | | 7/2004 | Gerresheim et al. |

FOREIGN PATENT DOCUMENTS

| | | | |
|---|---|---|---|
| EP | 0595653 | | 5/1994 |
| EP | 0 881 105 A2 | | 12/1998 |
| EP | 0890454 | | 1/1999 |
| EP | 1 083 064 | | 3/2004 |
| EP | 1700718 | | 9/2006 |
| JP | 58093605 | | 6/1983 |
| JP | 59145607 | | 8/1984 |
| JP | 04163209 | * | 6/1992 |
| JP | 04208609 | | 7/1992 |
| JP | 08300913 | | 11/1996 |
| JP | 2001 071714 | | 3/2001 |
| JP | 200121918 | | 5/2001 |
| JP | 2002-205515 | * | 7/2002 |
| LU | 77 020 A | | 7/1977 |
| WO | WO9853981 | | 12/1998 |
| WO | WO2005113260 | | 12/2005 |

OTHER PUBLICATIONS

International Search Report and Written Opinion of the International Searching Authority issued by the European Patent Office Dec. 21, 2006 (9 pages).

Fischer, Justin; Non-final rejection in U.S. Appl. No. 11/217,738, Mar. 5, 2007.

Fischer, Justin; final rejection in U.S. Appl. No. 11/217,738, Jun. 18, 2007.

Fischer, Justin; Non-final rejection in U.S. Appl. No. 11/217,738, Nov. 15, 2007.

Fischer, Justin; Non-final rejection in U.S. Appl. No. 11/217,738, May 22, 2008.

Fischer, Justin; final rejection in U.S. Appl. No. 11/217,738, Sep. 30, 2008.

Fischer, Justin; Non-final rejection in U.S. Appl. No. 11/217,738, Mar. 13, 2009.

Jin, Jie; Non-final rejection in U.S. Appl. No. 11/217,167, Feb. 21, 2007.

Jin, Jie; Final rejection in U.S. Appl. No. 11/217,167, Jun. 18, 2007.

Jin, Jie; Non-final rejection in U.S. Appl. No. 11/217,167, Nov. 14, 2007.

Jin, Jie; Final rejection in U.S. Appl. No. 11/217,167, Mar. 18, 2008.

Jin, Jie; Non-final rejection in U.S. Appl. No. 11/217,167, Jul. 1, 2008.

Jin, Jie; Final rejection in U.S. Appl. No. 11/217,167, Dec. 31, 2008.

Jin, Jie; Non-final rejection in U.S. Appl. No. 11/217,167, Apr. 8, 2009.

* cited by examiner

TIRE HAVING A SIDEWALL REINFORCEMENT

FIELD OF THE INVENTION

The present application relates to tires and, more particularly, to a tire with a sidewall reinforcement to improve sidewall performance of the tire.

BACKGROUND

In an inflated and loaded condition, a radial tire is subject to bending moments at the sidewall areas at the center of the tire footprint. The strains and stresses created by the moments are directly related to the sidewall performance of the tire.

Previous research and studies have demonstrated that the maximum sidewall surface strain occurs in the least stiff area of the sidewall of a tire. Because of cord compression created during the loading of the tire, the combined cord tension in the upper sidewall area is reduced and that area is most vulnerable to sidewall bending. Therefore, the maximum sidewall surface strain is located in the upper sidewall area.

SUMMARY

A tire, which has a maximum section width, an upper section above the maximum section width, and a lower section below the maximum section width, includes a tread extending circumferentially about the tire, a pair of sidewalls, a pair of bead portions, and at least one carcass ply extending circumferentially about the tire from one bead portion to the other. The tire further includes first and second reinforcement plies extending circumferentially about the tire and being disposed between the at least one carcass ply and the tread and at least one of the sidewalls of the tire. The first and second reinforcement plies have lower ends that terminate in the lower section of the tire.

BRIEF DESCRIPTION OF DRAWINGS

The accompanying drawings, together with the detailed description provided below, describe exemplary embodiments of the claimed invention. In the drawings and description that follow, like elements are identified with the same reference numerals. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to lines or directions extending along the perimeter of the surface of the tread parallel to the equatorial plane and perpendicular to the axial direction of the tire.

"Equatorial plane" refers to the plane that is perpendicular to the tire's axis of rotation and passes through the center of the tire's tread.

"Groove" refers to an elongated void area in the tread of the tire that extends circumferentially in a straight, curved or zig-zag manner.

"Lateral" or "laterally" refer to a direction along the tread of the tire going from one sidewall of the tire to the other sidewall.

"Radial" or "radially" refer to a direction perpendicular to the axis of rotation of the tire.

"Sidewall" refers to that portion of the tire between the tread and the bead.

"Tread" refers to that portion of the tire that comes into contact with the road under normal load.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
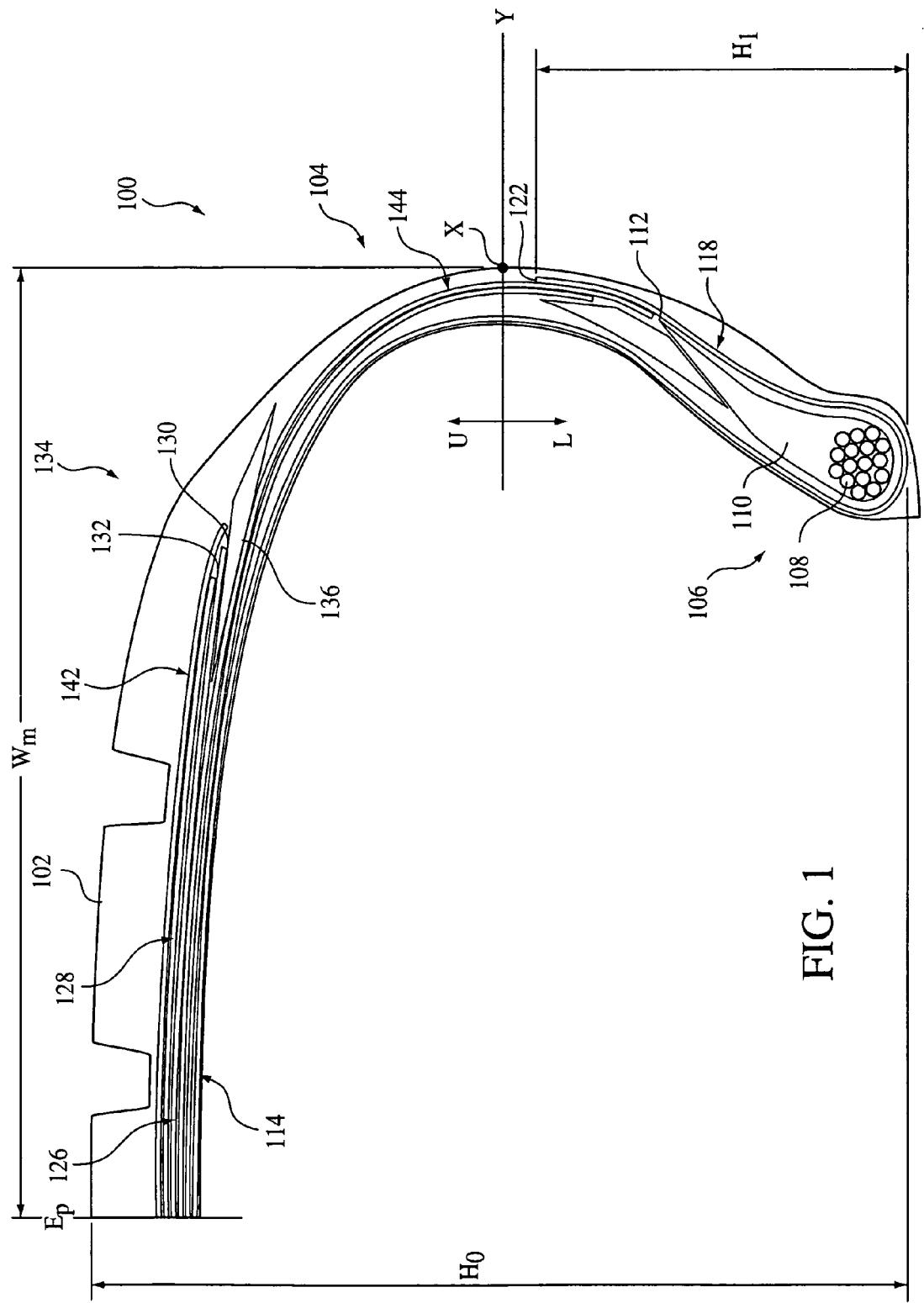
FIG. 1 is a cross-sectional view of one embodiment of half of a tire 100.

Illustrated in FIG. 1 is a cross-sectional view of half of one embodiment of a tire 100. Although only half of the tire 100 is depicted in the drawings, it will be appreciated that the other half of the tire 100 is a substantial mirror image of the half depicted. The tire 100 has an equatorial plane $E_p$ and a maximum section width $W_m$ measured from the equatorial plane $E_p$ to the outer most point of the tire 100 (i.e., point X). The tire 100 can be divided into two sections—an upper section U and a lower section L. Separating the upper section U from the lower section L is a hypothetical line Y drawn through point X that is substantially parallel to the axis of rotation of the tire 100. The upper section U is the portion of the tire 100 that is disposed above the maximum section width $W_m$ of the tire 100 (represented by line Y), while the lower section L is disposed below the maximum section width $W_m$ of the tire 100 (represented by line Y).

With continued reference to FIG. 1, the tire 100 includes a tread 102 provided in the upper section U of the tire 100, a sidewall 104 provided in both the upper and lower sections U, L of the tire 100, and a bead assembly 106 provided in the lower section L of the tire 100. The bead assembly 106 includes a bead core 108 and a bead filler 110 having an upper end 112.

The tire 100 includes a carcass ply 114 that extends circumferentially about the tire 100 from one bead assembly (e.g., bead assembly 106) to the other bead assembly (not shown). The carcass ply 114 is wound outwardly about the bead core 108 and extends upwardly towards the tread 102 to form a turn-up portion 118. The turn-up portion 118 terminates at a turn-up end 122. Although the tire 100 illustrated in FIG. 1 includes one carcass ply, the tire 100 can include two or more carcass plies in alternative embodiments (not shown).

With continued reference to the embodiment illustrated in FIG. 1, the turn-up portion 118 of the carcass ply 114 has a height $H_1$ measured radially from the turn-up end 122 to the base of the bead core 108. Preferably, the height $H_1$ of the first turn-up portion 118 is between about 30% and about 70% of the section height $H_0$ (which is measured from the outer tread surface at the equatorial plane $E_p$ to the base of the bead core 108). In alternative embodiments (not shown), the height $H_1$ of the first turn-up portion 118 may be less than 30% or greater than 70% of the section height $H_0$ depending on the design.

In one embodiment, the carcass ply 114 includes parallel-aligned cords that are radially disposed. In other words, the parallel-aligned cords are oriented substantially perpendicular to the equatorial plane $E_p$ of the tire 100. In alternative embodiments, the carcass ply can include parallel-aligned cords that are biased with respect to the equatorial plane $E_p$ of the tire 100. In all cases, the cords can be constructed of, for example, nylon or polyester.

With continued reference to FIG. 1, the tire 100 further includes first and second belts 126, 128 that extend circumferentially about the tire 100. The first and second belts 126, 128 are provided between the tread 102 and the first and second carcass plies 114, 116 as shown in FIG. 1. The first and second belts 126, 128 terminate at edges 130, 132, respectively, at a location near a shoulder region 134 of the tire 100. Although the tire 100 illustrated in FIG. 1 features two belts, the tire 100 can include a single belt or more than two belts in alternative embodiments (not shown).

In one embodiment, the first and second belts 126, 128 include parallel-aligned cords or wires that are radially disposed. In alternative embodiments, one or more of the belts can include parallel-aligned cords or wires that are biased with respect to the equatorial plane $E_p$ of the tire 100. In all cases, the cords or wires can be constructed of, for example, steel or other steel alloys.

With continued reference to FIG. 1, the tire 100 also includes a belt edge insert 136 provided in the shoulder region 134 of the tire 100 between the edges 130, 132 of the first and second belts 126, 128, respectively, and the carcass ply 114. The belt edge insert 136 has an inner end 138 and an outer end 140. The belt edge insert 136 is configured to protect the carcass ply 114 from the edges of the belts 126, 128. The belt edge insert 136 is constructed of extruded rubber, but may be constructed of another elastomeric material. Although shown in the FIG. 1 embodiment, the belt edge insert 136 is optional and may be omitted in alternative embodiments (not shown).

The tire 100 further includes a tread cap 142 provided between the tread 102 and the first and second belts 126, 128. The tread cap 142 can be used to assist in holding the components of the tire together (e.g., the belts, plies, and tread). The tread cap 142 can include, for example, one or more polyester or nylon fabric plies. Although shown in the FIG. 1 embodiment, the tread cap 142 is optional and may be omitted in alternative embodiments (not shown).

As shown in FIG. 1, the tire 100 also includes a dual layer reinforcement 144 provided between the carcass ply 114 and the tread 102 and sidewall 104 (or portion thereof) of the tire 100. Although the tire 100 features a dual layer reinforcement 144, the reinforcement can include one layer or three or more layers in alternative embodiments (not shown).

Figure 2:
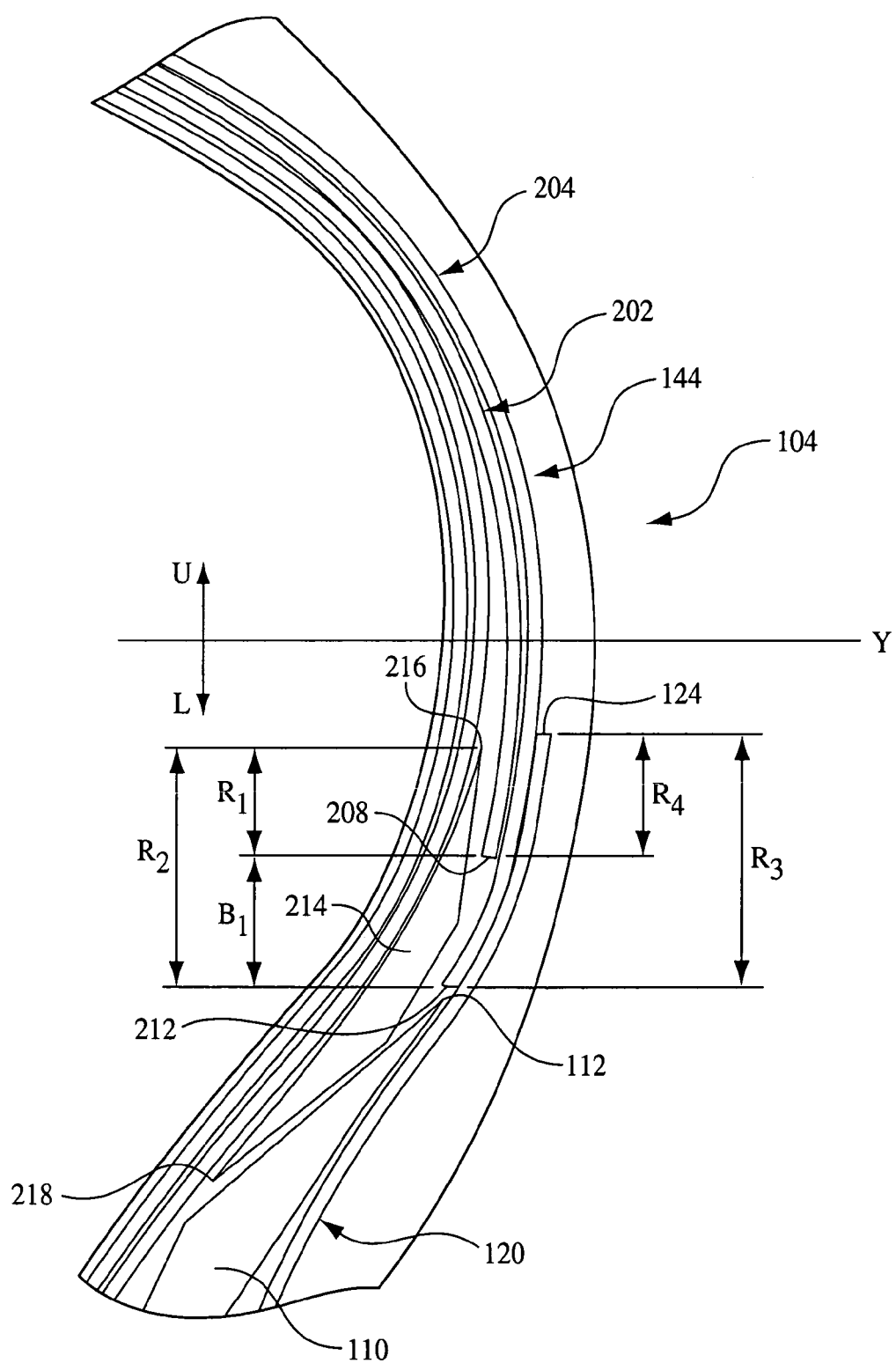
FIG. 2 is an enlarged perspective view of a portion of the tire 100 of FIG. 1.

Illustrated in FIG. 2 is an enlarged perspective view of a portion of the tire 100 of FIG. 1 depicting the positioning of the dual layer reinforcement 144 in the tire 100 in greater detail. The dual layer reinforcement 144 includes first and second reinforcement plies 202, 204 that extend circumferentially about the tire 100. The first and second reinforcement plies 202, 204 are provided between the carcass ply 114 and the tread 102 and sidewall 104 of the tire 100. The first reinforcement ply (or inner reinforcement ply) 202 has a lower end 208, while the second reinforcement ply (or outer reinforcement ply) 204 a lower end 212.

As shown in the embodiment illustrated in FIG. 2, the lower end 212 of the second reinforcement ply 204 extends below the lower end 208 of the first reinforcement ply 202. More specifically, the lower end 212 of the second reinforcement ply 204 extends below the lower end 208 of the first reinforcement ply 202 a radial distance B, between about 3 mm and about 6 mm. In alternative embodiments (not shown), the lower end 212 of the second reinforcement ply 204 may not extend below the lower end 208 of the first reinforcement ply 202.

With continued reference to FIG. 2, the tire 100 also includes a bead filler insert 214 having an upper end 216 and a lower end 218. The bead filler insert 214 is positioned above the bead filler 112 and between the reinforcement plies 202, 204 and the carcass ply 114. The bead filler insert 214 is configured to serve as a cushion between the reinforcement plies 202, 214 and the carcass ply 114. The bead filler insert 214 is constructed of rubber, but may be constructed of another elastomeric material. Although the bead filler insert 214 is illustrated as a separate component, it can be an extension of the bead filler 112.

The lower ends 208, 212 of the first and second reinforcement plies 202, 204 terminate in the lower section L of the tire 100. More specifically, the lower ends 208, 212 of the first and second reinforcement plies 202, 204 may extend below the upper end 216 of the bead filler insert 214. In other words, the bead filler insert 214 may overlap the first and second reinforcement plies 202, 204. Preferably, the lower end 208 of the first reinforcement ply 202 extends below the upper end 216 of the bead filler insert 214 a radial distance $R_1$ between about 4 mm and about 6 mm. Similarly, the lower end 212 of the second reinforcement ply 204 extends below the upper end 216 of the bead filler insert 214 a radial distance $R_2$ between about 10 mm and about 15 mm.

The termination of the lower ends 208, 212 of the first and second reinforcement plies 202, 204 can also be discussed in relation to the turn-up end 124 of the carcass ply 114. For example, the lower ends 208, 212 of the first and second reinforcement plies 202, 204 extend below the turn-up end 124 of the carcass ply 114. In other words, the turn-up portion 118 of the carcass ply 114 overlaps the first and second reinforcement plies 202, 204. Preferably, the lower end 212 of the second reinforcement ply 204 extends below the turn-up end 124 of the carcass ply 114 a radial distance $R_3$ (which is approximately the same distance as $R_2$ as shown in FIG. 2) between about 10 mm and about 15 mm. Similarly, the lower end 208 of the first reinforcement ply 202 extends below the turn-up end 124 of the carcass ply 114 a radial distance $R_4$ (which is approximately the same distance as $R_1$ as shown in FIG. 2) between about 4 mm and about 6 mm.

Although FIGS. 1 and 2 illustrate only half of a cross-section of the tire 100, the dual layer reinforcement extends to the other sidewall (not shown) of the tire 100 where lower ends of the dual layer reinforcement terminate in the lower section L of the other sidewall (not shown) of the tire 100. In other words, the dual layer reinforcement can be referred to as a "half-ply" reinforcement since it covers the upper half of the tire 100 and extends from the lower section L of one sidewall (e.g., sidewall 104) of the tire to the lower section L of the other sidewall (e.g., the sidewall not shown) of the tire 100.

Figure 3:
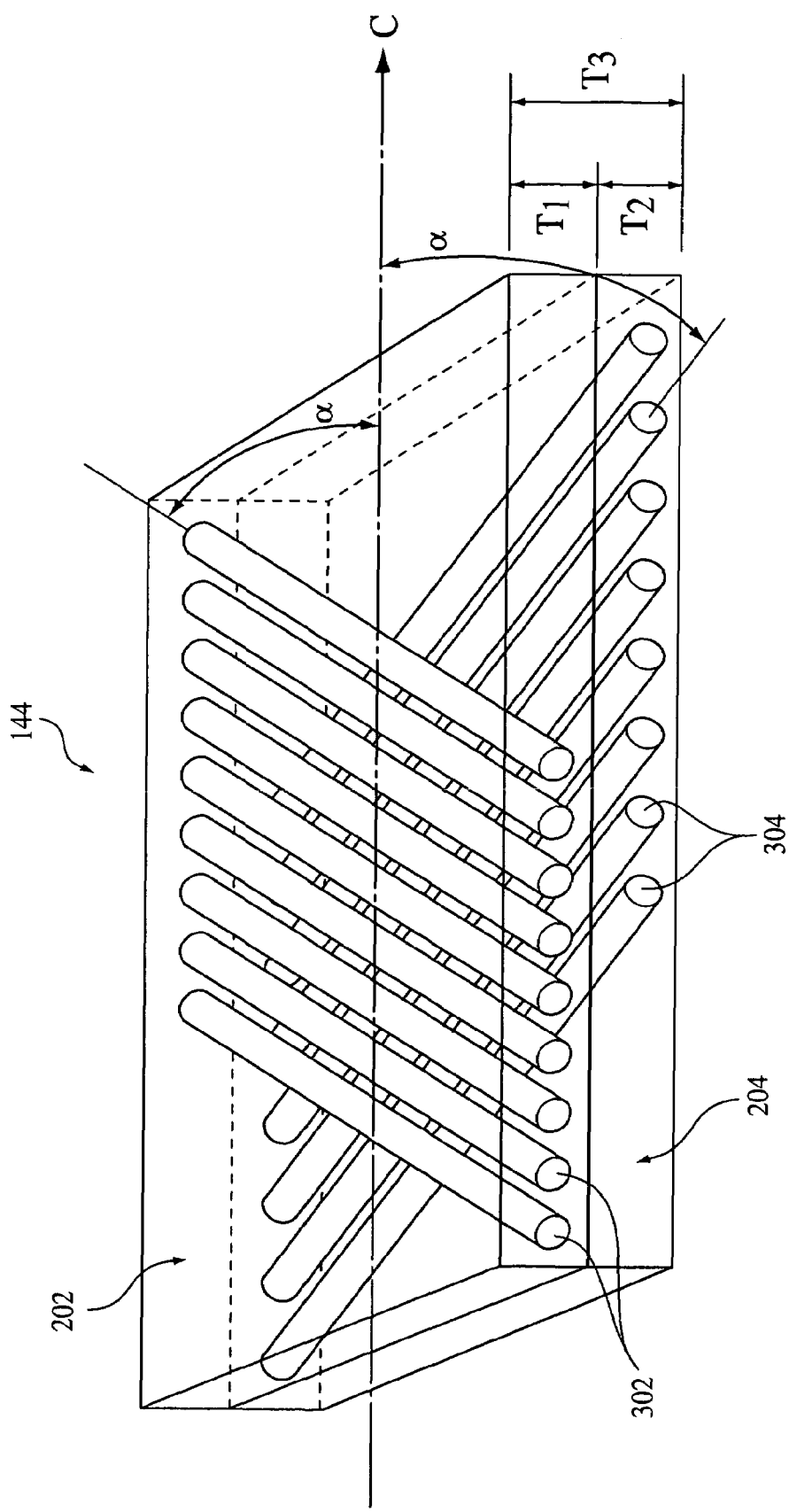
FIG. 3 is a perspective view of one embodiment of a portion of a dual reinforcement layer provided in the tire 100 of FIG. 1.

Illustrated in FIG. 3 is a perspective view of a portion of one embodiment of the dual layer reinforcement 144, which includes first and second reinforcement plies 202, 204. The first reinforcement ply 202 includes a first set of parallel-aligned cords 302 encapsulated in rubber or another elastomeric material. Similarly, the second reinforcement ply 204 includes a second set of parallel-aligned cords 304 encapsulated in rubber or another elastomeric material.

As shown in FIG. 3, the dual layer reinforcement 144 is illustrated as an integral component having a first layer (i.e., first reinforcement ply 202) and a second layer (i.e., second reinforcement ply 204). In this case, the dual layer reinforcement 144 can be installed as a single component during the green tire assembly process. In an alternative embodiment (not shown), the first and second reinforcement plies 202, 204 can be discrete layers that are installed separately during the green tire assembly process, yet cooperate with each to form the dual layer reinforcement 144 at the conclusion of the tire manufacturing process.

With reference to FIG. 3, the first and second set of parallel-aligned cords 302, 304 are oriented at an angle $\alpha$ with respect to circumferential direction C of the tire 100. Preferably, the first and second sets of parallel-aligned cords 302, 304 are oriented at an angle $\alpha$ between about 45° and 85° with respect to the circumferential direction C of the tire 100 and are transversely oriented with respect to each other. In alternative embodiments (not shown), the angular orientation of one or both sets of parallel-aligned cords 302, 304 can be less than 45° with respect to the circumferential direction C of the tire 100 depending on the design. In addition, one or both sets of parallel-aligned cords 302, 304 can be radially or circumferentially disposed. Furthermore, the parallel-aligned cords 302, 304 need not be oriented transverse to each other.

The first reinforcement ply 202 preferably has a thickness $T_1$ between about 0.6 mm and about 1.2 mm and the second reinforcement ply 204 preferably has a thickness $T_2$ between about 0.6 mm and about 1.2 mm. Most preferably, the first reinforcement ply 202 has a thickness of about 1.0 mm and the second reinforcement ply 204 has a thickness of about 1.0 mm. Hence, the preferred total thickness $T_3$ of the dual layer reinforcement is about 2.0 mm.

In one embodiment, the first and second sets of parallel-aligned cords 302, 304 are constructed of nylon. In alternative embodiments, one or both sets of parallel-aligned cords 302, 304 may be constructed of polyester, rayon, or steel.

By providing the dual layer reinforcement in one or both sidewalls of a tire, sidewall performance of the tire is improved. For example, when the tire deflects, the dual layer reinforcement is shifted outward towards the sidewall of the tire, thereby increasing the stiffness of the sidewall of the tire. As stiffness of the sidewall of the tire increases, surface strain in the sidewall of the tire decreases. Reduction of surface strain at the sidewall of the tire can lead to a reduction of surface cracks at the sidewall of the tire, a reduction of deflection of the sidewall, and/or an improvement in vehicle handling.

The following example demonstrates the potential effects of providing the dual layer reinforcement in both sidewalls of a tire and should not be construed as limiting the scope or spirit of the present application.

EXAMPLE 1

A P255/45R/18 tire, having a maximum allowable inflation of 35 psi and maximum load capacity of 1709 lb (hereinafter referred to as the "Control Tire"), was inflated to 19 psi (its minimum allowable inflation) and mounted on a fixture. A computer system was used to simulate the Control Tire to obtain dimensional data of the Control Tire in its unloaded state.

A maximum load of 1709 psi was then applied to the Control Tire causing it to deflect. The computer system then obtained dimensional data of the Control Tire in its loaded state. The dimensional data of the Control Tire in its unloaded state was then compared to the dimensional data of the Control Tire in its loaded state to determine actual strain values along various points on the sidewall of the Control Tire.

This dimensional data was also used to create a computer simulated model of the Control Tire. Modifications could be made to the computer simulated model of the Control Tire to create virtual tires. From these virtual tires, surface strain values along any point on the sidewall of a tire could be predicted. In this case, the computer simulated model of the Control Tire was modified to create a virtual tire that included a half-ply, dual layer reinforcement (nylon cords; 45° equal, but opposite bias) similar to the one described above and shown in FIG. 3 (hereinafter be referred to as the "Reinforced Tire").

Figure 4:
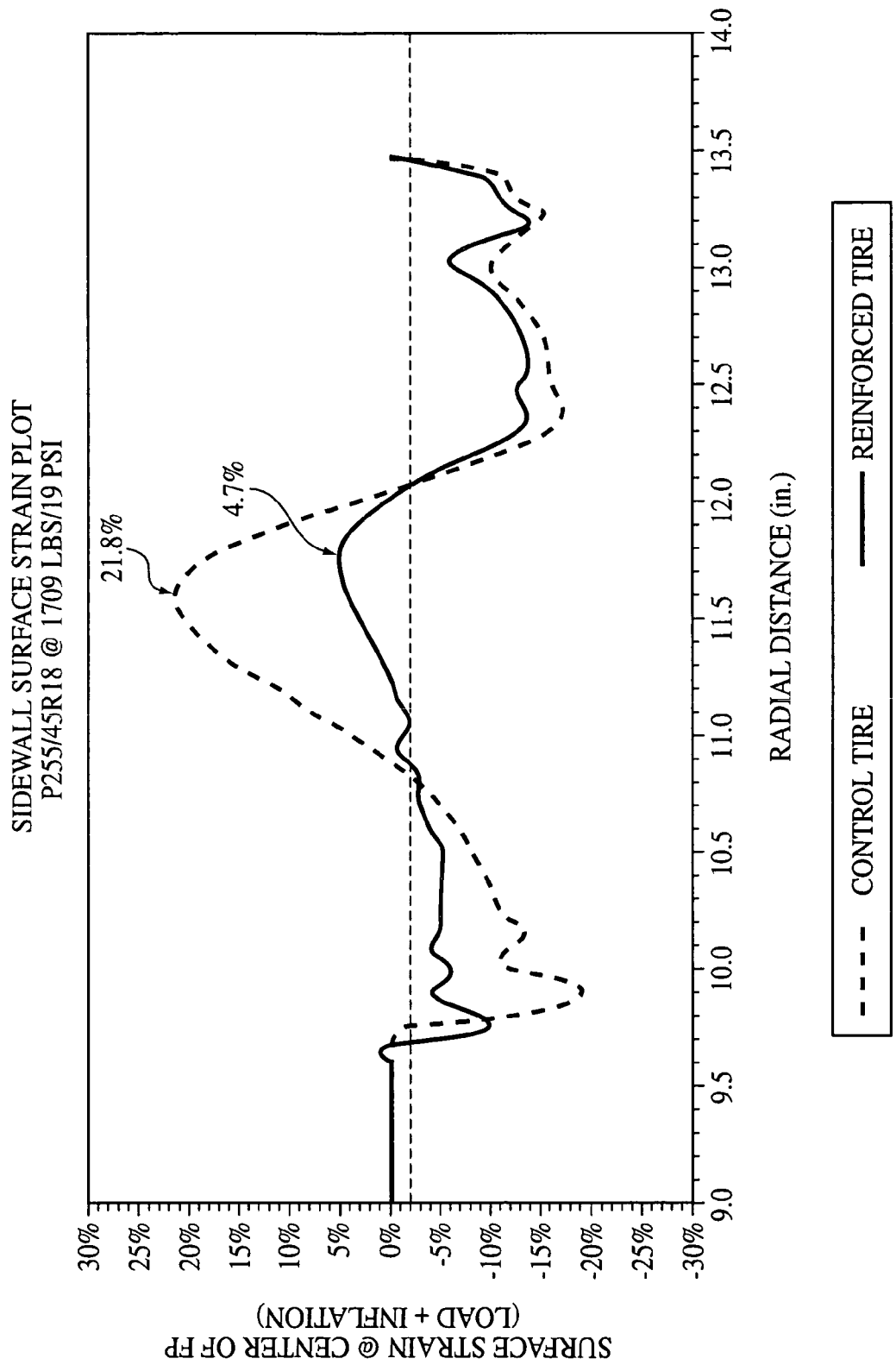
FIG. 4 is a sidewall surface strain plot comparing a P255/45R18 tire with and without a sidewall dual layer reinforcement.

FIG. 4 illustrates the sidewall surface strain graph comparing the predicted surface strain values of the Control Tire with the predicted surface strain values of the Reinforced Tire. The x-axis represents the radial distance in inches from the axis of rotation of the tires, while the y-axis represents the surface strain at the center of the footprint of the tires. In this case, since both tires have a diameter of 18 inches, surface strain measurements were taken at a radial distance beginning at 9 inches and ending at about 13.5 inches (which is the end of the sidewall of the tires). As shown in the graph in FIG. 4, the predicted maximum sidewall surface strain of the Control Tire was 21.8%, while the predicted maximum sidewall surface strain of the Reinforced Tire was 4.7%. This represents a reduction in sidewall surface strain of about 17.1%.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See. Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's claimed invention.

The invention claimed is:

1. A tire having a section height, a maximum section width, an upper section above the maximum section width, and a lower section below the maximum section width, the tire comprising:
   a tread extending circumferentially about the tire;
   a pair of sidewalls;
   a pair of bead portions, each comprising a bead core, a bead filler having upper walls that converge at an apex at a radially outward position, and a separate bead filler insert, wherein the separate bead filler insert is provided in the lower section of the tire above the bead filler and the separate bead filler insert is spaced from the bead filler by a gap;
   at least one carcass ply extending circumferentially about the tire from one bead portion to the other; and
   at least two reinforcement plies for increasing sidewall stiffness, the at least two reinforcement plies including first and second reinforcement plies extending circumferentially about the tire and being disposed between the at least one carcass ply and the tread of the tire, the first and second reinforcement plies extend from one sidewall to the other and have lower ends that terminate in the lower section of the tire,
   wherein the separate bead filler insert is provided between the first and second reinforcement plies and the at least one carcass ply, an upper end of the separate bead filler insert extends above the lower ends of the first and second reinforcement plies, a lower end of the separate bead filler insert extends below an upper end of the bead filler, and the gap between the bead filler and the separate bead filler insert consists of a rubber material,
   wherein the first reinforcement ply includes a first set of parallel-aligned cords and the second reinforcement ply includes a second set of parallel-aligned cords that are transversely oriented with respect to the first set of reinforcement cords of the first reinforcement ply.

2. The tire of claim 1, wherein the angular orientation of the first and second sets of parallel-aligned cords are between about 45 degrees and 85 degrees with respect to a circumferential direction of the tire.

3. The tire of claim 2, wherein the first and second sets of the parallel-aligned cords are constructed of nylon.

4. The tire of claim 1, wherein the first reinforcement ply has a thickness between about 0.6 mm and about 1.2 mm and the second reinforcement ply has a thickness between about 0.6 mm and about 1.2 mm.

5. The tire of claim 1, wherein the at least one carcass ply includes radial disposed cords.

6. The tire of claim 1, wherein the at least one carcass ply is wound outwardly about each of the bead cores and extends toward the tread to form turn-up portions that terminates at turn-up ends, wherein the lower ends of the first and second reinforcement plies extend below the turn-up ends of the at least one carcass ply.

7. The tire of claim 6, wherein the turn-up end of the turn-up portion is located in the lower section of the tire.

8. The tire of claim 6, wherein the turn-up portion has a height that is between about 30% and about 70% of the section height of the tire.

9. The tire of claim 6, wherein at least one of the lower ends of the first and second reinforcement plies extends below the turn-up end of the at least one carcass ply a radial distance between about 4 mm and about 15 mm.

10. The tire of claim 6, wherein the lower ends of the first and second reinforcement plies are provided between the at least one carcass ply and the turn-up portion of the at least one carcass ply.

11. The tire of claim 1, further comprising at least one belt extending circumferentially about the tire, the at least one belt provided between the tread and the at least one carcass ply.

12. A tire comprising:
    a circumferentially extending tread;
    a pair of sidewalls;
    a belt layer underlying the tread;
    a pair of bead assemblies, each comprising a bead core, a bead filler, and a bead filler insert, wherein the bead filler insert is provided above the bead filler and the bead filler insert is spaced from the bead filler by a gap, and wherein upper walls of the bead filler converge at an apex at a radially outward position;
    at least one circumferentially extending carcass ply, the at least one carcass ply extends from one bead assembly to the other and includes at least one turn-up portion that extends upwardly towards the tread and terminates at a turn-up end; and
    first and second circumferentially extending reinforcement plies for increasing sidewall stiffness, the first and second reinforcement plies being disposed between the at least one carcass ply and the belt layer, the first and second reinforcement plies extend from one sidewall to the other and have lower ends that overlap the at least one turn-up portion of the at least one carcass ply,
    wherein the bead filler insert is provided between the first and second reinforcement plies and the at least one carcass ply, an upper end of the bead filler insert extends above the lower ends of the first and second reinforcement plies, a lower end of the bead filler insert extends below an upper end of the bead filler, and the gap between the bead filler and the bead filler insert does not include carcass cords,
    wherein the first reinforcement ply includes a first set of parallel-aligned cords and the second reinforcement ply includes a second set of parallel-aligned cords that are transversely oriented with respect to each other.

13. The tire of claim 12, wherein the first and second reinforcement plies are biased.

14. The tire of claim 13, wherein the first set of parallel-aligned cords of the first biased reinforcement ply are oriented at an angle between about 45 degrees and 85 degrees with respect to a circumferential direction of the tire, and the second set of parallel-aligned cords of the second biased reinforcement ply are oriented at an angle between about 45 degrees and 85 degrees with respect to the circumferential direction of the tire.

15. The tire of claim 14, wherein the lower end of the second biased reinforcement ply extends downwardly beyond the lower end of the first biased reinforcement ply a radial distance between about 4 mm and about 6 mm.

16. The tire of claim 14, wherein the lower ends of the first and second reinforcement plies terminate in a lower portion of one of the sidewalls of the tire.

17. The tire of claim 14, wherein the first and second sets of parallel-aligned cords are constructed of a material selected from the group consisting of nylon, polyester, rayon, and steel.

18. A tire having a maximum section width, an upper section above the maximum section width, and a lower section below the maximum section width, the tire comprising:
- a tread that extends circumferentially about the tire;
- a pair of sidewalls;
- a pair of bead assemblies, each bead assembly includes a bead filler having upper walls that converge at an apex at a radially outward position, a bead core, and a bead filler insert, wherein the bead filler insert is provided above the bead filler and the bead filler insert is spaced from the bead filler by a gap;
- at least one carcass ply having radially disposed cords, the at least one carcass ply extending circumferentially about the tire from one bead assembly to the other, each end of the at least one carcass ply being wound outwardly about a respective bead core and extends toward the tread to form a turn-up portion that terminates at a turn-up end; and
- first and second biased reinforcement plies for increasing sidewall stiffness, the first and second biased reinforcement plies extending circumferentially about the tire and being disposed between the at least one carcass ply and the tread, the first and second biased reinforcement plies extend from one sidewall to the other and terminate in the lower section of respective sidewalls of the tire,
- wherein the bead filler insert is provided between the first and second reinforcement plies and the at least one carcass ply, an upper end of the bead filler insert extends above the lower ends of the first and second reinforcement plies, a lower end of the bead filler insert extends below an upper end of the bead filler, and the gap between the bead filler and the bead filler insert consists of a rubber material,
- wherein the first and second biased reinforcement plies each include parallel-aligned cords that are transversely oriented with respect to each other.

19. The tire of claim 18, wherein the parallel-aligned cords of the first and second biased reinforcement plies are oriented at an angle between 0 degrees and 45 degrees with respect to a circumferential direction of the tire.

20. The tire of claim 19, wherein the parallel-aligned cords of the first and second biased reinforcement plies are constructed of polyester.

21. The tire of claim 18, wherein the pair of biased reinforcement plies terminate below a respective turn-up end of the at least one carcass ply.

* * * * *